United States Patent
Mu et al.

(10) Patent No.: US 12,501,124 B2
(45) Date of Patent: Dec. 16, 2025

(54) CAMERA SYSTEMS AND EVENT-ASSISTED IMAGE PROCESSING METHODS

(71) Applicant: OMNIVISION TECHNOLOGIES, INC., Santa Clara, CA (US)

(72) Inventors: Bo Mu, San Jose, CA (US); Rui Jiang, Singapore (SG)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 231 days.

(21) Appl. No.: 18/396,318

(22) Filed: Dec. 26, 2023

(65) Prior Publication Data

US 2025/0211839 A1    Jun. 26, 2025

(51) Int. Cl.
| | |
|---|---|
| H04N 23/45 | (2023.01) |
| G06T 7/11 | (2017.01) |
| G06T 7/187 | (2017.01) |
| G06T 7/20 | (2017.01) |
| G06T 7/60 | (2017.01) |
| H04N 25/47 | (2023.01) |

(52) U.S. Cl.
CPC ............... *H04N 23/45* (2023.01); *G06T 7/11* (2017.01); *G06T 7/187* (2017.01); *G06T 7/20* (2013.01); *G06T 7/60* (2013.01); *H04N 25/47* (2023.01); *G06T 2207/20221* (2013.01); *G06T 2207/30252* (2013.01)

(58) Field of Classification Search
CPC . G06T 2207/20221; G06T 2207/30252; G06T 5/50; G06T 7/11; G06T 7/187; G06T 7/20; G06T 7/60; H04N 23/45; H04N 25/47
See application file for complete search history.

(56) References Cited

U.S. PATENT DOCUMENTS

| | | | |
|---|---|---|---|
| 11,263,751 B2 | 3/2022 | Saha et al. | |
| 11,558,542 B1* | 1/2023 | Mu | G06V 20/35 |
| 2020/0134827 A1* | 4/2020 | Saha | G06V 20/13 |
| 2022/0070392 A1 | 3/2022 | Izawa et al. | |
| 2024/0233310 A1* | 7/2024 | Yamaguchi | G06T 7/254 |
| 2025/0124549 A1* | 4/2025 | Perrone | G06T 5/73 |
| 2025/0220317 A1* | 7/2025 | Mu | H04N 25/709 |
| 2025/0299066 A1* | 9/2025 | Sharpe | G06N 5/022 |

* cited by examiner

*Primary Examiner* — Antoinette T Spinks
(74) *Attorney, Agent, or Firm* — MUNCY, GEISSLER, OLDS & LOWE, P.C.

(57) ABSTRACT

The present disclosure provides a camera system and an event-assisted image processing method. The camera system includes an image sensor, an event-based sensor, and a processing unit. The image sensor is configured to capture visual images of a targeted scene to obtain image sensing frames with a first frequency. The event-based sensor is configured to capture event data of the targeted scene to obtain event frames with a second frequency higher than the first frequency. The processing unit is configured to: receiving the image sensing frames within a predetermined time period; accumulating the event frames within the predetermined time period; generating a temporal-spatial mask indicating interested areas for the event frames; determining geometric features in the temporal-spatial masks; synchronizing the image sensing frames and the event frames at timestamps within the predetermined time period; and fusing the temporal-spatial mask with the image sensing frames to obtain a masked visual image.

20 Claims, 16 Drawing Sheets

CAMERA SYSTEMS AND EVENT-ASSISTED IMAGE PROCESSING METHODS

TECHNICAL FIELD

The present disclosure relates to a camera system and an event-assisted image processing method.

BACKGROUND

Camera systems commonly use visual images captured by image sensors such as CMOS image sensor (CIS) for object detection and tracking. Such systems can be utilized on vehicles for detecting and tracking objects on the road. As technology evolves, the resolution and frame rate of the images increase, as does the amount of data, whereby the camera system can experience increased latency and, as a result, have difficulty balancing operating speed and resolution. This can reduce accuracy of detection. In some situations, such as on-vehicle camera systems, the latency can cause serious problems.

Accordingly, it is called for to develop a fast and reliable approach to alleviate the problems described, and improve camera system performance.

SUMMARY

One aspect of the present disclosure provides a camera system. The camera system includes an image sensor, an event-based sensor, and a processing unit. The image sensor is configured to capture visual images of a targeted scene to obtain image sensing frames with a first frequency. The event-based sensor is configured to capture event data of the targeted scene to obtain event frames with a second frequency higher than the first frequency. The processing unit is configured to: receiving the image sensing frames within a predetermined time period; accumulating the event frames within the predetermined time period; generating a temporal-spatial mask indicating interested areas for the event frames; detecting geometric features in the temporal-spatial masks; and synchronizing the image sensing frames and the event frames at timestamps within the predetermined time period; and fusing the temporal-spatial mask with the image sensing frames to obtain a masked visual image.

Another aspect of the present disclosure provides an event-assisted image processing method. The method includes: obtaining image sensing frames with a first frequency within a predetermined time period; obtaining event frames with a second frequency higher than the first frequency within the predetermined time period; generating a temporal-spatial mask indicating interested areas for the event frames; detecting geometric features in the temporal-spatial masks; synchronizing the image sensing frames and the event frames at timestamps within the predetermined time period; and fusing the temporal-spatial mask with the image sensing frames to obtain a masked visual image.

Since the camera system utilizes event sensors or event sensing pixels that record variations in light intensity in a targeted scene with no need to detect color information or absolute light intensity, faster response, increased dynamic range, less memory buffer and computation, and reduced power consumption can all be achieved. Therefore, the camera system can increase operating speed and image resolution.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

DETAILED DESCRIPTION

The following description of the disclosure accompanies drawings, which are incorporated in and constitute a part of this specification, and which illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

In order to make the present disclosure completely comprehensible, detailed steps and structures are provided in the following description. Obviously, implementation of the present disclosure does not limit special details known by persons skilled in the art. In addition, known structures and steps are not described in detail, so as not to unnecessarily limit the present disclosure. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
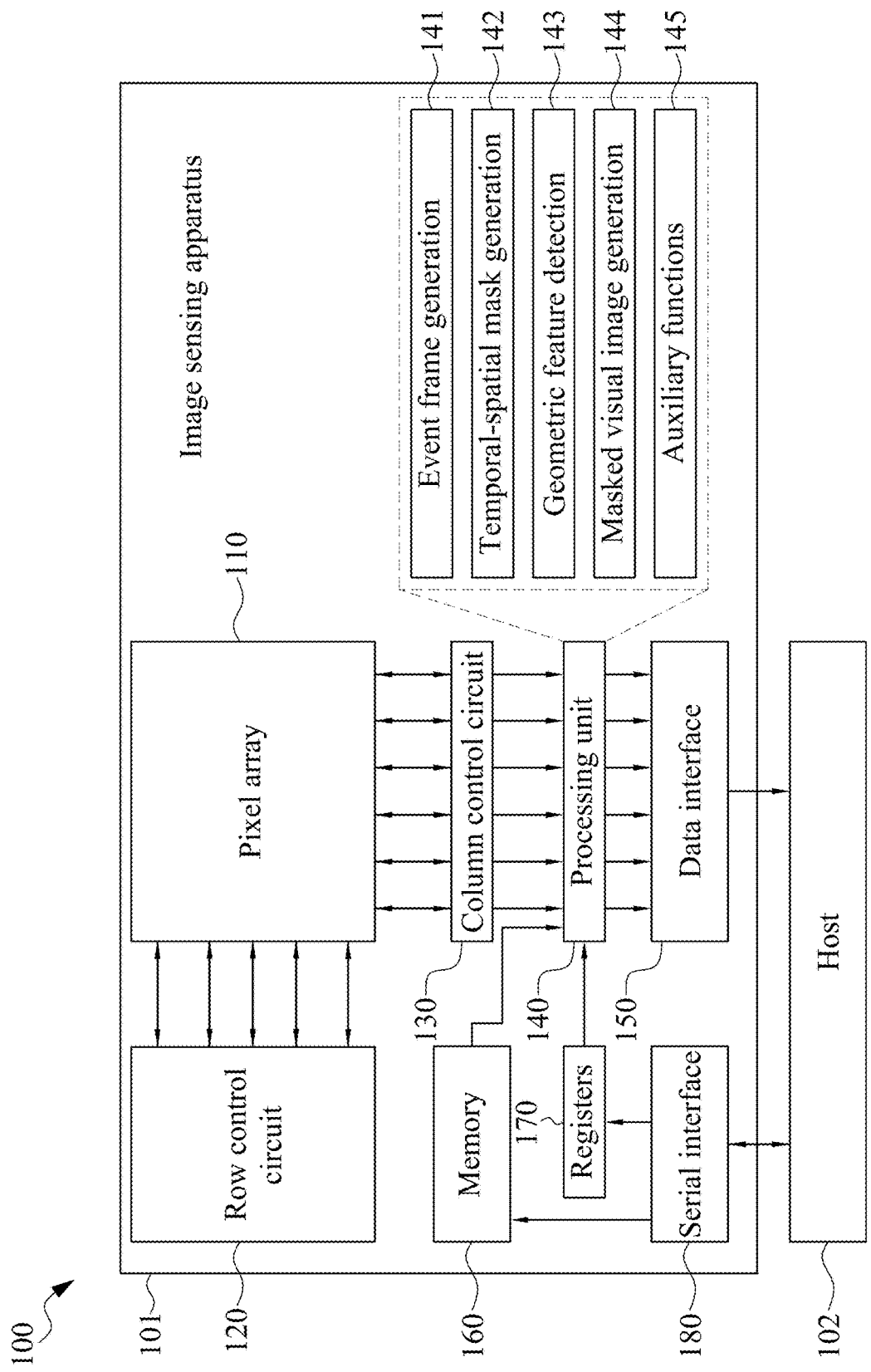
FIG. 1 is a functional block diagram of an imaging system including an image sensor, in accordance with some embodiments of the present disclosure.

FIG. 1 is a functional block diagram of an imaging system 100 including an image sensing apparatus 101, in accordance with some embodiments of the present disclosure. The imaging system 100 includes an image sensing apparatus 101 and a host 102.

The image sensing apparatus 101 may include a detection agent (such as a pixel array) and processing agent (such as a processor).

The host 102 may be a computer for transferring image data for display, storage, or manipulation. The host 102 may be an automobile, manufacturing machine, on-vehicle device, medic device, cell phone, etc.

The image sensing apparatus 101 may be coupled to the host 102. The image sensing apparatus 101 may communicate with the host 102. In some embodiments, the image sensing apparatus 101 can be an image sensor, an event-based sensor, or a hybrid sensor including the image sensor and the event-based sensor.

The image sensing apparatus 101 includes a pixel array 110. The image sensing apparatus 101 may include a row control circuit 120 and a column control circuit 130 coupled to the pixel array 110. The image sensing apparatus 101 may further include a processing unit 140, a data interface 150, a memory 160, a register 170, and a serial interface 180.

In one example, the pixel array 110 may be a photodiode array, such as a two-dimensional (2D) array of photodiodes. The photodiodes in the pixel array 110 can be arranged into rows and columns (not shown) to acquire image data of a target, which can then be used to focus, acquire, and render a 2D image thereof. In one example, each photodiode in pixel array 110 can be configured to photogenerate image charge and/or phase detection autofocus charge in response to incident light. The image charge and/or phase detection autofocus charge generated in each photodiode may be transferred to a shared floating diffusion in each pixel circuit, which is converted to an image signal or a phase detection autofocus signal. In one embodiment, the pixel array 110 may include a plurality of event sensing pixels, which are configured to capture event data of the targeted scene (details of the event data will be discussed later).

In some embodiments, the pixels of the pixel array 110 are electrically coupled to the row control circuit 120 and the column control circuit 130 via row and column signal lines, respectively. That is, each individual row of pixels is connected to, and controlled by, the row control circuit 120 via an associated set of row signal lines including, for example, a transfer line, a reset line, and a row select line. Each individual column of pixels is connected to the column control circuit 130 via a discrete column signal line. The column control circuit 130 may include sampling components (not shown) such as, for example, amplifiers, analog-to-digital converters (ADC), and data storage elements coupled to the column signal lines for digitizing and storing the electrical signals output from the pixels.

In some embodiments, the image signals read out from the pixel array 110 may be processed by the processing unit 140. The image signals from pixel array 110 may be amplified, and/or digitized by the processing unit 140. In some embodiments, a readout circuit may read out a row of data at a time along column bitlines, or may read out the data using a variety of other techniques (not illustrated), such as a serial readout or a full parallel readout of all pixel circuits simultaneously. The processing unit 140 may store the image data or even manipulate the image data by applying post image effects (e.g., crop, rotate, remove red eye, adjust brightness, adjust contrast, or otherwise).

The processing unit 140 may perform one or more processes on the image signals. The processes includes at least one of following operations: detecting, segmenting, extracting, amplifying, digitizing, and analyzing the image signals.

In one embodiment, the processing unit 140 may be coupled to the memory 160 that stores instructions for execution by the processing unit 140. The instructions, when executed, may cause the processing unit 140 to perform operations associated with the various functional modules, logic blocks, or circuitry of the processing unit 140. The memory 160 can be a non-transitory computer-readable storage medium that may include, without limitation, a volatile (e.g., RAM) or non-volatile (e.g., ROM) storage system readable by controller 450.

A non-transitory computer-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium can include recordable/non-recordable media (e.g., read only memory (ROM), random access memory (RAM), magnetic disk storage media, optical storage media, flash memory devices, etc.). In some embodiments, the memory 160 may be a one-time programmable (OTP) memory.

The register 170 may include, for example, memory, in which information (such as operational settings or parameters) are stored and/or changed. The register 170 may be coupled to the processing unit 140. In some embodiments, the processing unit 140 may operate based at least in part on the operational settings/parameters stored in the register 170. The register 170 may be coupled to the host 102, via the serial interface 180, thus facilitating loading and/or modification of the operational settings/parameters stored therein during an initialization process. Optionally, the register 170 can include non-volatile memory, making initialization unnecessary.

In some embodiments, the processing unit 140 may include, but is not limited to, at least one of the following functions: event frame generation 141, temporal-spatial mask generation 142, geometric feature detection 143, masked visual image generation 144, and auxiliary functions 145. Details of such functions are discussed subsequently. For example, event frame generation 141 can be found in at least FIG. 2, FIG. 3A and FIG. 3B. The temporal-spatial mask generation 142 can be found in at least FIG. 2, FIG. 5. The geometric feature detection 143 can be found in at least FIG. 2, FIGS. 6A-6C, FIGS. 7A-7C, and FIG. 8. The masked visual image generation 144 can be found in at least FIG. 2, FIG. 9, FIG. 10, and FIGS. 11A-11C. In some embodiments, auxiliary functions 145 can include processing the electrical signals and/or image data (e.g., applying post image effects such as crop, rotate, remove red eye, adjust brightness, adjust contrast, or otherwise).

The foregoing processes may be implemented using software and/or hardware. The techniques described may constitute machine-executable instructions embodied within a tangible or non-transitory computer readable storage medium, that when executed by a machine (e.g., the processing unit 140) will direct the machine to perform the operations described. Additionally, the processing unit 140 may be embodied within hardware, such as an application specific integrated circuit (ASIC), field programmable gate array (FPGA), or otherwise.

The processed image signals (or data) may be transmitted to the host 102 via the data interface 150. The host 102 may be coupled and communicated to the memory 160 and the register 170 via the serial interface 180. In some embodiments, the imaging system 100 may be utilized in an on-vehicle computing system.

Figure 2:
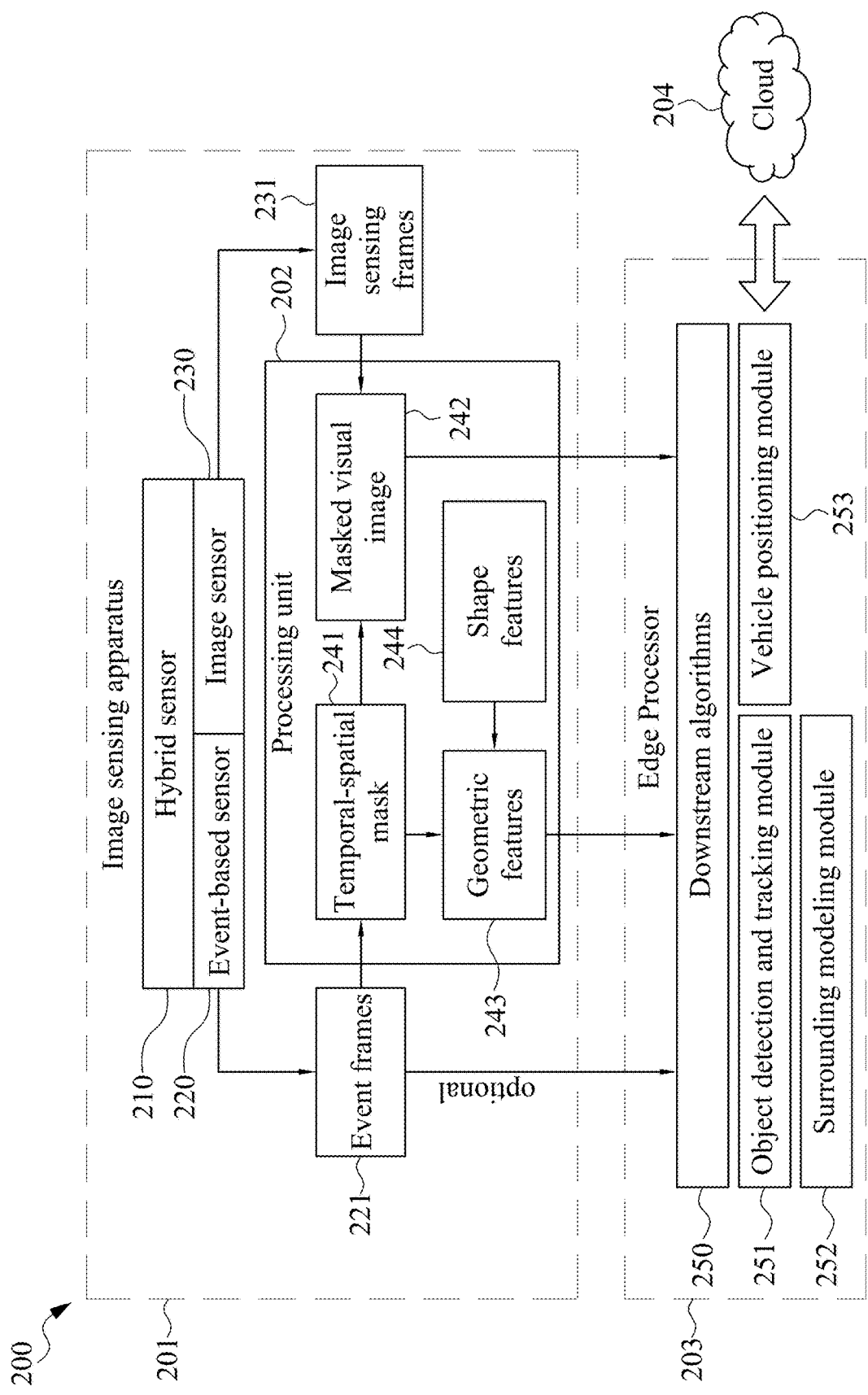
FIG. 2 is a functional block diagram of an imaging system including a hybrid sensor, in accordance with some embodiments of the present disclosure.

FIG. 2 is a functional block diagram of a camera system 200, in accordance with some embodiments of the present disclosure. The camera system 200 includes an image sensing apparatus 201. The camera system 200 may further include an edge processor 203 coupled to cloud 204.

In some embodiments, the image sensing apparatus 201 includes a hybrid sensor 210 and a processing unit 202. The processing unit 202 may be a system on chip (SOC). In some embodiments, the hybrid sensor 210 can be coupled to the processing unit 202. In some embodiments, the edge processor 203 can be located on a vehicle having an on-vehicle computing system.

In some embodiments, the hybrid sensor 210 includes an event-based sensor 220 and an image sensor 230.

The image sensor 230 includes a plurality of image sensing pixels, configured to capture a visual image of a targeted scene. In one embodiment, the image sensor 230 can be configured to capture visual images of the targeted scene to obtain image sensing frames 231. In some embodiments, the image sensing frames 231 can be obtained in a frequency. For example, an equivalent framerate of the image sensor 230 can be 10, 30, or 60 fps. In some embodiments, the image sensor 230 can be a CMOS Image Sensor (CIS). The image sensing frames 231 can be visual images or color images. For example, the image sensing frames 231 can be a CMOS image sensing (CIS) frame.

The event-based sensor 220 includes a plurality of event sensing pixels, configured to capture event data of the targeted scene. The event data indicates which pixels of the event sensing pixels have changed. For example, the event data indicates which pixels of the event sensing pixels have changes in light intensity. In some embodiments, the event data can be utilized to determine whether a scene change occurs in the targeted scene. The event-based sensor 220 can be configured to capture event data of the targeted scene to obtain event frames 221.

As mentioned, the event-based sensor 220 is used to detect variations of light intensity in a targeted scene. When a subject moves, the event-based sensor 220 obtains event data set based on the variations in light intensity caused by the motion-based event. For example, when a subject moves from a first position to a second position within a time period, light intensities change from the first position to the second position. In other words, light intensities change in both positions. In some embodiment, an event sensing pixel of the event-based sensor 220 will output a first value when detecting an increase in light intensity, and another event sensing pixel of the event-based sensor 220 will output a second value when detecting a decrease. The event data set may include coordinates of pixels experiencing changes in light intensity within a time period, and the value output by those event sensing pixels.

Since the plurality of event sensing pixels in the event-based sensor 220 are used to record variations in light intensity in a scene with no need to detect the color information and absolute light intensity, temporal resolution of the event-based sensor 220 can be substantially higher than a temporal resolution (i.e., fps) of the image sensor 230. That is, the frequency of the event frames 221 can be higher than the frequency of the image sensing frames 231. The memory usage and power consumption of the event-based sensor 220 may be substantially equal to or lower than that of the image sensor 230. For example, an equivalent framerate of the event-based sensor 220 may exceed 300, 500, or 1000 fps. In some embodiments, the data frequency of the event frames 221 can be configurable depending on the required time resolution and data rate. In addition, according to the design of pixels of event sensors, the event-based sensor 220 has an inherently high dynamic range (e.g., higher than 100 dB), which gives more advantage compared to image sensors. For example, the event-based sensor 220 may still function in challenging lighting conditions in which image sensor 230 cannot.

Furthermore, since the event-based sensor 220 is mainly used to detect events, with no need to capture a detailed image of the targeted scene, the event-based sensor 220 may require lower image resolution than the image sensor 230. In some embodiments, the event frames 221 can have a bit width being binary, 8-bit, or higher, depending on the required time resolution and data rate.

In some embodiments, the event-based sensor 220 and the image sensor 230 are independently configured in the image sensing apparatus 201. In some embodiments, the plurality of event sensing pixels and the plurality of image sensing pixels can be formed together as a hybrid structure, thereby simplifying the installment of the image sensing apparatus 201.

The processing unit 202 can be configured to receive the image sensing frames 231 and the event frames 221. In some embodiments, the processing unit 202 can be configured to perform steps or methods in accordance with some embodiments of the present disclosure. The steps or methods can include, but not limited to, at least one of operations as follows: temporal-spatial mask extraction, temporal-spatial synchronization, mask fusing, and geometric feature detection. In some embodiments, the processing unit 202 can be configured to generate and/or store temporal-spatial masks 241, masked visual images 242, and geometric features 243. In some embodiments, the processing unit 202 may include a memory storing geometric shapes 244 of specified objects for obtaining the geometric features 243.

The event frames 221 generated by the event-based sensor 220 can be transmitted to the processing unit 202, and the processing unit 202 can generate a temporal-spatial mask 241 indicating interested areas for the event frames by processing the event frame 221. The processing unit 202 may extract portions from the event frame 221. In some embodiments, the processing unit 202 is configured to determine whether a scene change occurs in the targeted scene according to the event frames 221. In other words, the processing unit 202 is configured to track movements of specified objects in the event frames 221.

Focusing on the scene changes in the event frame 221, the processing unit 202 may be configured to analyze connected-components for the event frames 221. In some embodiments, the processing unit 202 may be configured to segment the event frames 221 into granularities. The temporal-spatial mask 241 may be generated under at least one predetermined granularity. In some embodiments, the temporal-spatial mask 241 can be binary, 8-bit, or higher, depending on the granularity. In some embodiments, the temporal-spatial mask 241 may be in ROI format (x, y, w, h) to reduce data rate.

To obtain the masked visual images 242, the processing unit 202 may synchronize the image sensing frames 231 and the event frames 221 at timestamps within a predetermined time period, such that the temporal-spatial mask 241 generated from the event frame 221 can correspond to a particular image sensing frame. After time alignment, the temporal-spatial mask 241 can be fused with the particular image sensing frame to obtain a masked visual image 242. The masked visual image may replace some portions of the image sensing frame 231 with one or more temporal-spatial masks 241, obtained from the event frame 221. In some embodiments, the masked visual image 242 may be transmitted to the edge processor 203 for performing several processing and analysis.

In some embodiments, the masked visual image 242 are partially replaced by the temporal-spatial masks 241, which have lower data size, and thus the masked visual image 242 may have higher data rate than the regular visual image. Since at least some portions of the masked visual image 242 may be replaced by the temporal-spatial masks 241, which do not include a detailed image of the target scene, the masked visual image 242 may require lower image resolution than the regular visual image. The masked visual image 242 may have lower memory usage and power consumption. In some embodiments, the masked visual image 242 having reduced latency can be used for the driving assistant system, such as autonomous emergency braking (AEB).

To obtain geometric features 243, the processing unit 202 may obtain the geometric shapes 244 from the memory to determine geometric features 243 in the temporal-spatial masks 241. In some embodiments, the geometric shapes 244 may include points, straight lines, curves, circles, rectangles, triangles, ellipses, and trapezoids or any other geometric shapes. In some embodiments, the processing unit 202 may be configured to filter out unreliable shapes and then determine geometric features 243 in the temporal-spatial masks 241. The processing unit 202 may be configured to encode the geometric features 243 into a set of geometric shape parameters. For example, the set of geometric shape parameters may be encoded according to a shape formula corresponding to the geometric shapes 244. In some embodiments, the geometric features 243 may be encoded based on template matching algorithms or other suitable algorithms.

The geometric features 243 may be used in several vehicle related applications, for example, the navigation system, the advanced driver assistance system (ADAS), or other auto driving related applications.

Referring to FIG. 2, the image sensing apparatus 201 may transmit the masked visual image 242 and the geometric features 243 to the edge processor 203 for processing. In some embodiments, the event frames 221 may be optionally transmitted to the edge processor 203. In another embodiment, the temporal-spatial masks 241 may be transmitted to the edge processor 203 directly for processing. The edge processor 203 may be located on personal terminals, such as portable devices. The edge processor 203 may include one or more downstream algorithms 250 for processing the received data, such as the masked visual image 242 and the geometric features 243. For example, the downstream algorithms 250 may include, but are not limited to, at least one of object detection and tracking module 251, surrounding modeling module 252, and vehicle positioning module 253. These operations can be performed by the edge processor 203 based on input data, such as the masked visual image 242 and the geometric features 243.

In some embodiments, the edge processor 203 may utilize the cloud 204 to perform the downstream algorithms 250. For example, some parts of the downstream algorithms 250 may be performed by the cloud 204. In some embodiments, the edge processor 203 may access some data from the cloud to process the downstream algorithms 250.

The object detection and tracking module 251 may detect objects in the environments of the driver and track the same, such as other vehicles, traffic lights, road signs, street trees, traffic surface markings, etc. The surrounding modeling module 252 may detect objects surrounding the vehicle and model the surrounding environments. The vehicle positioning module 253 may assure the position of the vehicle to determine the distance between the vehicle and the surrounding objects and calibrate the vehicle position in the navigation system. In addition, the downstream algorithms 250 may assist the driver in better understanding and monitoring the traffic environments and can be utilized in the auto-drive technology. Therefore, the accuracy and performance of the on-vehicle computing system can be improved.

Figure 3A:
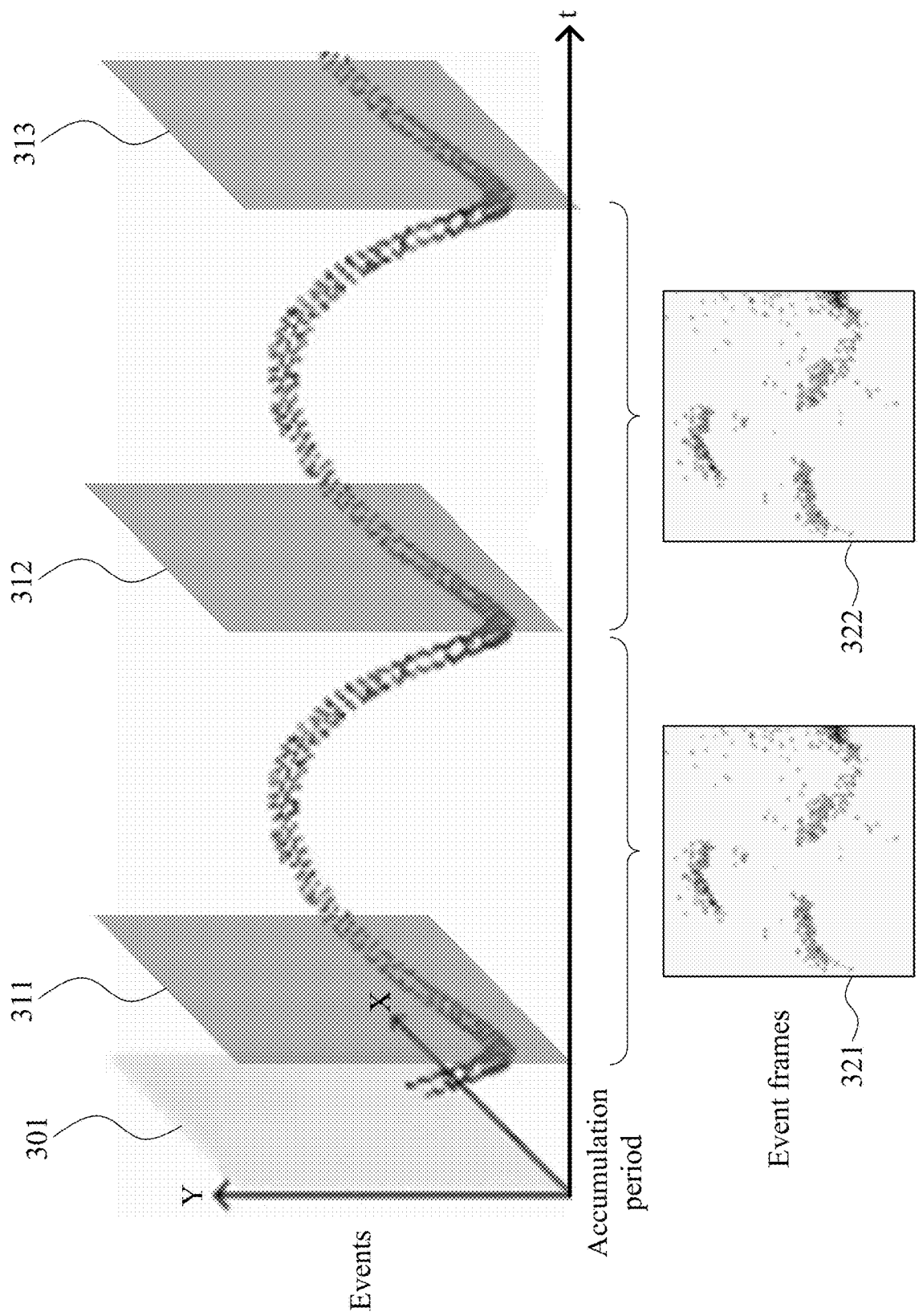
FIG. 3A is a schematic diagram of a method for generating event frames, in accordance with some embodiments of the present disclosure.

FIG. 3A is a schematic diagram of a method for generating event frames, in accordance with some embodiments of the present disclosure. Referring to FIG. 3A, a targeted scene 301 is provided. In some embodiments, the targeted scene 301 is a view of the event-based sensor. The targeted scene 301 may have an X-axis and a Y-axis to form an imaging plane and a temporal axis t. Along temporal axis t, a moving object moves in the targeted scene 301. In some embodiments, the targeted scene 301 can be captured to obtain a first scene 311 at the time of 0 s. The targeted scene 301 can be captured to obtain a second scene 312 at the time of 1 s. The targeted scene 301 can be captured to obtain a third scene 313 at the time of 2 second. In some embodiments, the event-based sensor can be configured to capture event data of the targeted scene 301 to obtain event frames. Within a time period from 0 s to 1 s, a first event frame 321 can be obtained by accumulating the scene changes occurring in the targeted scene (i.e., accumulating the changes between the first scene 311 and the second scene 312). Within a time period from 1 s to 2 s, a second event frame 322 can be obtained by accumulating the scene changes occurring in the targeted scene (i.e., accumulating the changes between the second scene 312 and the third scene 313).

Figure 3B:
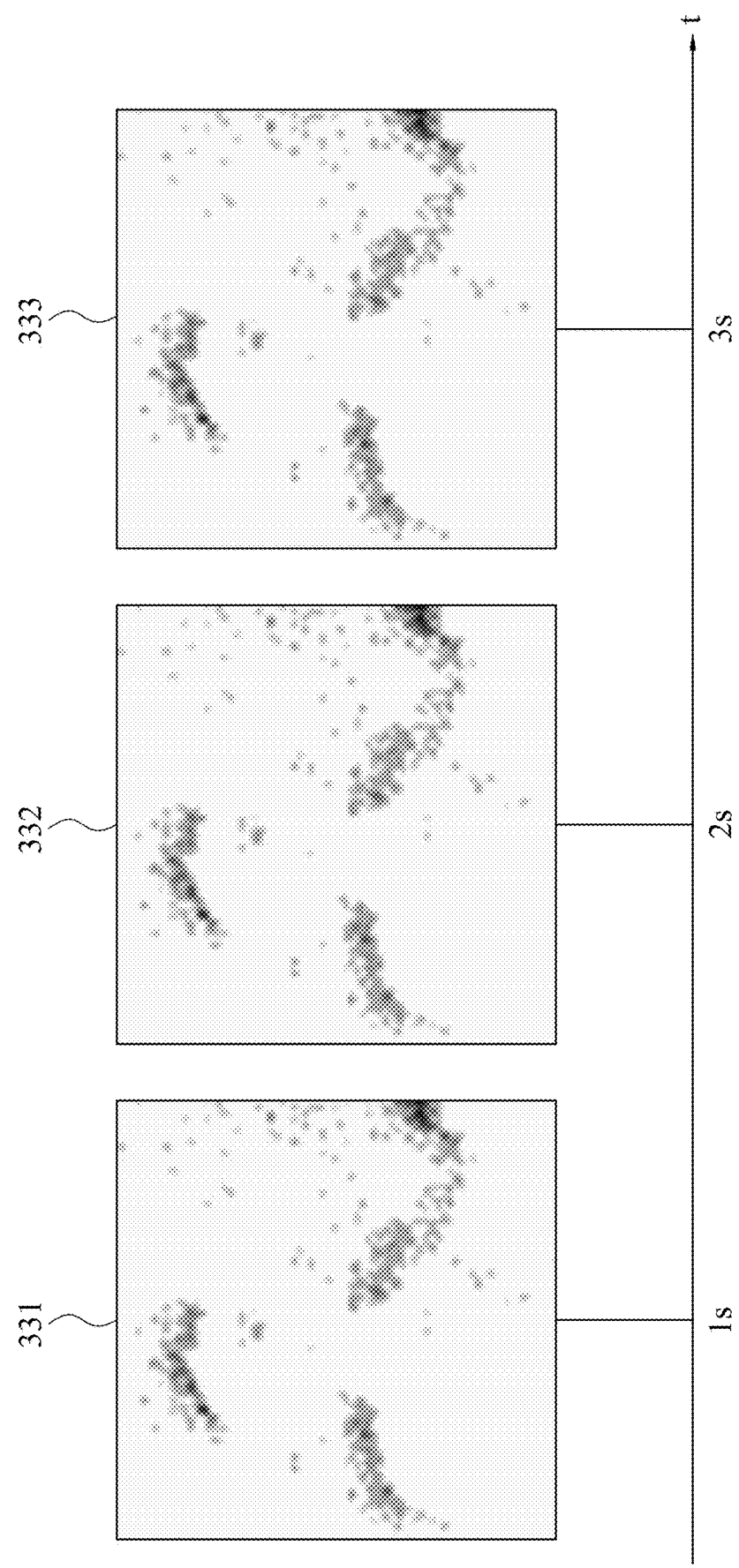
FIG. 3B is a schematic diagram of event frames along a timeline, in accordance with some embodiments of the present disclosure.

FIG. 3B is a schematic diagram of event frames along a temporal axis t, in accordance with some embodiments of the present disclosure. Referring to FIG. 3B, along the temporal axis t, the event frames 331, 332, and 333 may represent the targeted scene at 1 s, 2 s, and 3 s, respectively. In some embodiments, the event frame 331 can show the light intensity changes occurring in the targeted scene within 0 to 1 seconds. The event frame 332 shows the light intensity changes occurring in the targeted scene within 1 to 2 seconds. The event frame 333 shows the light intensity changes occurring in the targeted scene within 2 to 3 seconds.

Figures 4A, 4B, 4C:
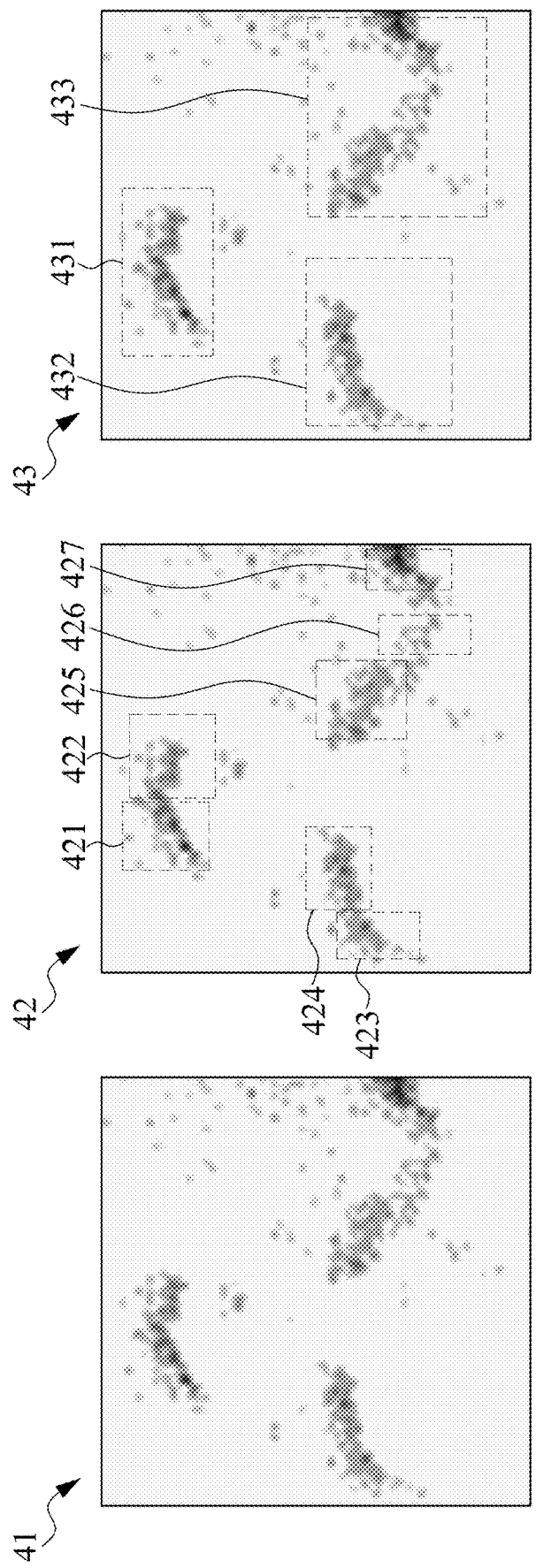
FIG. 4A is an event frame, in accordance with some embodiments of the present disclosure.
FIG. 4B is an event frame including temporal-spatial masks, in accordance with some embodiments of the present disclosure.
FIG. 4C is an event frame including temporal-spatial masks, in accordance with some embodiments of the present disclosure.

FIG. 4A is an event frame 41, in accordance with some embodiments of the present disclosure. The event frame 41 can be obtained according to the method shown in FIG. 3A.

FIG. 4B is an event frame 42 including temporal-spatial masks, in accordance with some embodiments of the present disclosure. The event frame 41 can be the original event frame of the event frame 42. Referring to FIG. 4B, the event frame 42 can include seven temporal-spatial masks 421, 422, 423, 424, 425, 426, and 427. In some embodiments, the temporal-spatial masks 421, 422, 423, 424, 425, 426, and 427 may be extracted from the event frame 42 under a first predetermined granularity. In some embodiments, event data less than the first predetermined granularity may be omitted (those points outside the temporal-spatial masks 421, 422, 423, 424, 425, 426, and 427).

FIG. 4C is an event frame 43 including temporal-spatial masks, in accordance with some embodiments of the present disclosure. The event frame 41 can be the original event frame of the event frame 43. Referring to FIG. 4C, the event frame 43 can include three temporal-spatial masks 431, 432, and 433. In some embodiments, the temporal-spatial masks 431, 432, and 433 can be extracted from the event frame 43 under a second predetermined granularity. In some embodiments, event data less than the second predetermined granularity can be omitted (those points outside the temporal-spatial masks 431, 432, and 433).

In some embodiments, the second predetermined granularity is different from the first predetermined granularity. For example, the second predetermined granularity is greater than the first predetermined granularity. Accordingly, the event frame 43 has fewer temporal-spatial masks than the event frame 42.

Figure 5:
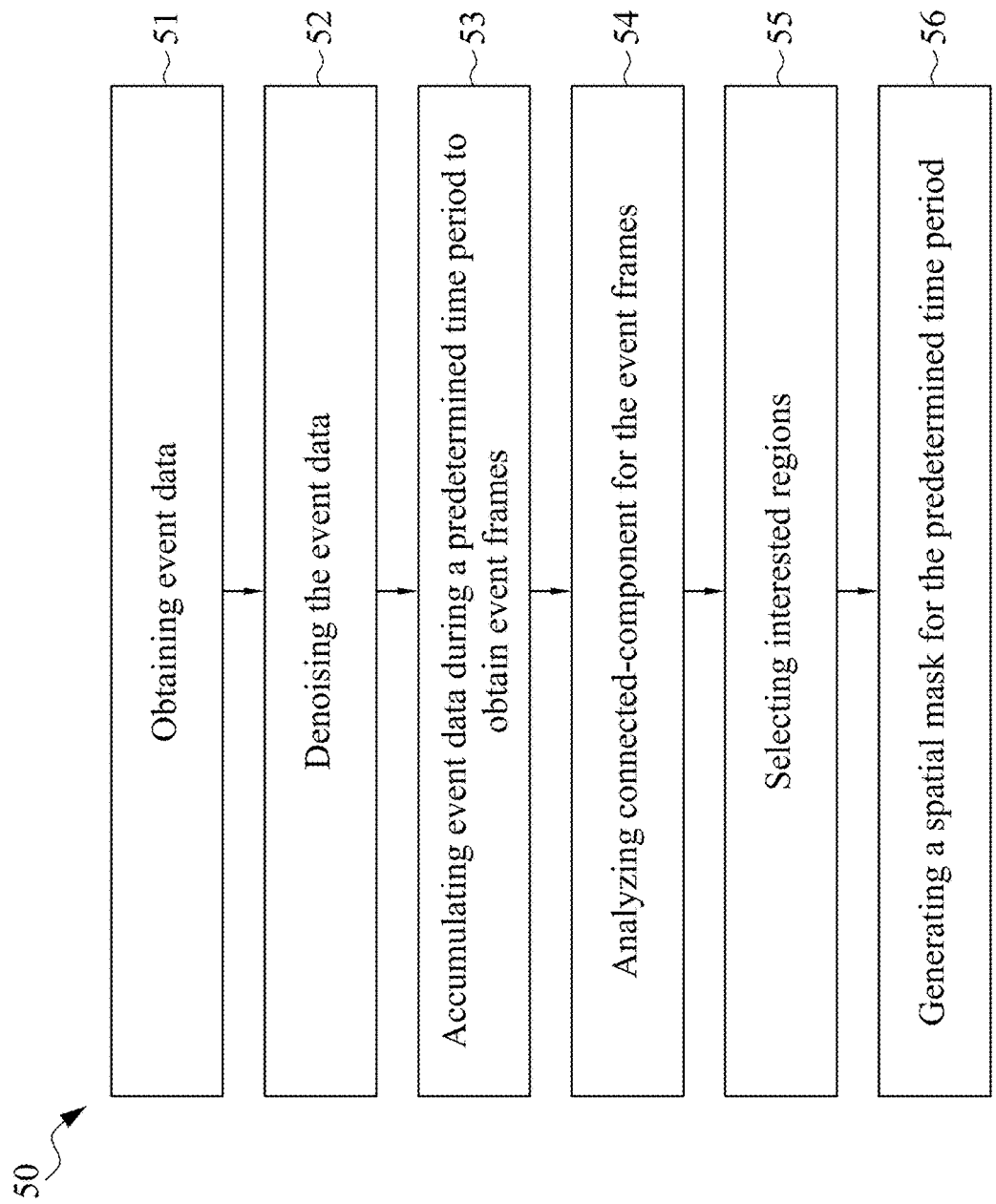
FIG. 5 is a flowchart of a method for generating a temporal-spatial mask, in accordance with some embodiments of the present disclosure.

FIG. 5 is a flowchart of a method 50 for generating a temporal-spatial mask, in accordance with some embodiments of the present disclosure. The operations of the method 50 can be executed by the processing unit 202 via the event-based sensor 220.

In operation 51, the event data can be obtained by the event-based sensor 220. In some embodiments, the event data indicates light intensity changes.

In operation 52, the event data may be denoised. In some embodiments, the processing unit 202 can be configured to denoise the event data. Therefore, undesired data, such as undesired noise, may be filtered.

In operation 53, the event data may be accumulated during a predetermined time period to obtain event frames. In some embodiments, the event frames may be obtained by the event-based sensor 220.

In operation 54, connected-components may be analyzed for the event frames. In some embodiments, a connected-component analysis may be performed on the event frames to obtain segmented event frames. In some embodiments, the processing unit is configured to segment the event frames into granularities. Therefore, the connected-component may be analyzed based on the granularities in the event frames. The connected component can be a cluster of granularities of event data. In some embodiments, the connected-component analysis may be utilized to determine a first portion of the event frames having scene changes and a second portion having none.

In operation 55, interested regions may be selected by the processing unit 202. In some embodiments, the processing unit 202 may compare and identify the segmented event frames and determine which parts are the interested regions.

In operation 56, a spatial mask for the predetermined time period may be generated. In some embodiments, the spatial mask for the predetermined time period can be the temporal-spatial mask 241.

Figure 6A:
FIG. 6A is an event frame, in accordance with some embodiments of the present disclosure.

FIG. 6A is an event frame 600, in accordance with some embodiments of the present disclosure. Referring to FIG. 6A, the event frame 600 may be obtained by the event-based sensor 220. In some embodiment, the event frame 600 may include one or more temporal-spatial masks (not shown).

Figure 6B:
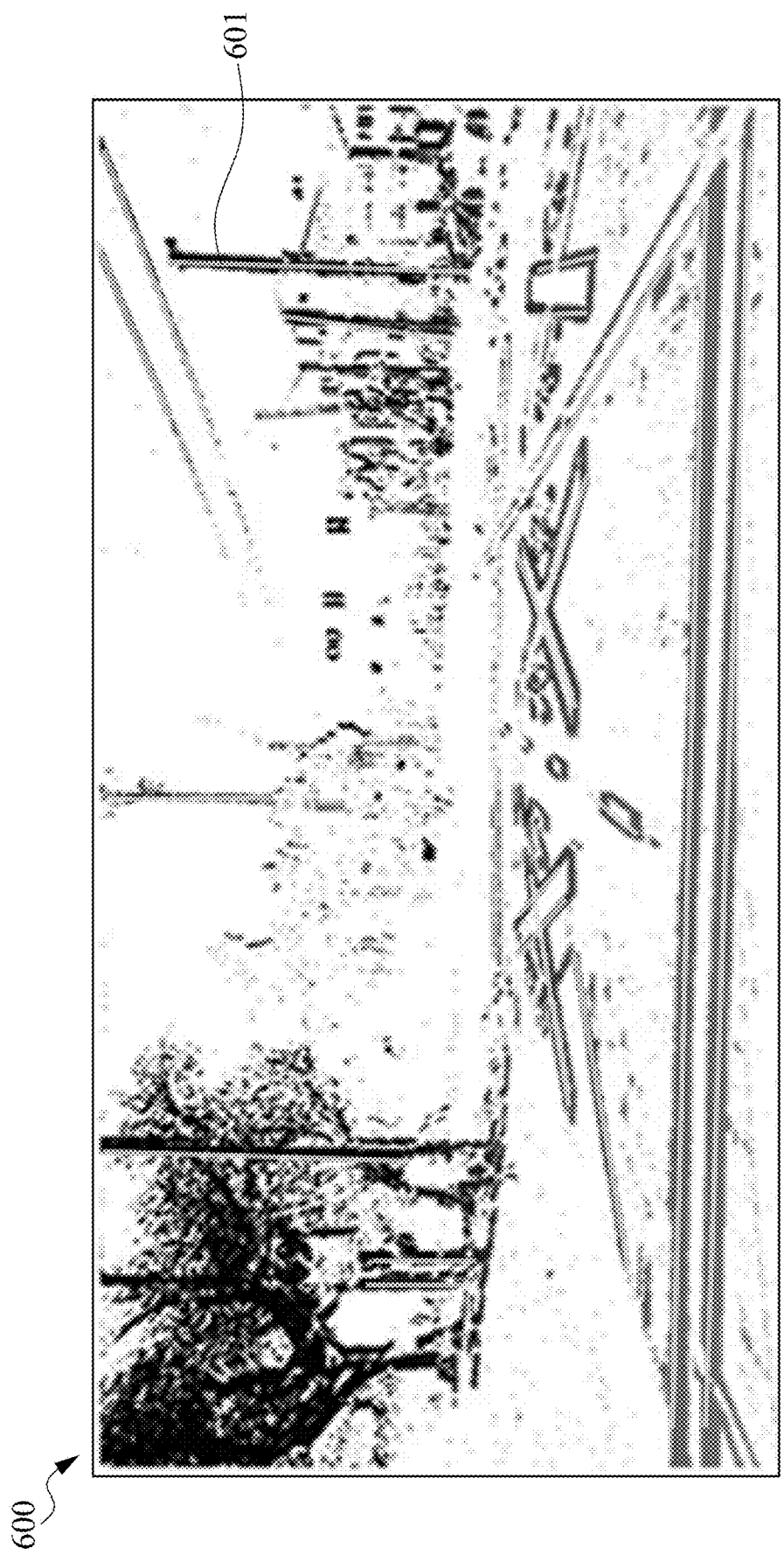
FIG. 6B is a schematic diagram of an event frame including determined geometric features, in accordance with some embodiments of the present disclosure.

FIG. 6B is a schematic diagram of an event frame 600 including determined geometric features 601, in accordance with some embodiments of the present disclosure. Referring FIG. 6B, the event frame 600 can be processed to determine geometric features 601. The processing unit 202 may obtain the geometric shapes 244 from the memory to determine geometric features 601 in the event frame 600. In some embodiments, the geometric features 601 in the event frame 600 may be straight lines. For example, the geometric features 601 may identify trees, lane markings, crosswalks, and utility poles.

The processing unit 202 may be configured to encode the geometric features 601 into a set of geometric shape parameters. After determining the position and size of the detected geometric features 601, the geometric features 601 can be encoded into a set of geometric shape parameters. In other words, the image can be converted to data. In such a case, the memory usage can be decreased. In some embodiments, the set of geometric shape parameters can be encoded according to a shape formula corresponding to the geometric features 601. Taking the line shape for example, the shape formula can be $y=ax+b$, $x \in [x_1, x_2]$, in which shape parameters a, b, $x_1$, and $x_2$ can be determined to identify the position and the size of detected geometric features 601. Similarly, the corresponding shape formula (not shown) of points, curves, circles, rectangles, triangles, ellipses, and trapezoids can be stored in the memory (which may be included in the processing unit 202) and obtained to encode the geometric features. For those geometric shapes without an explicit shape formula, template matching algorithms may be used for shape extraction.

Figure 6C:
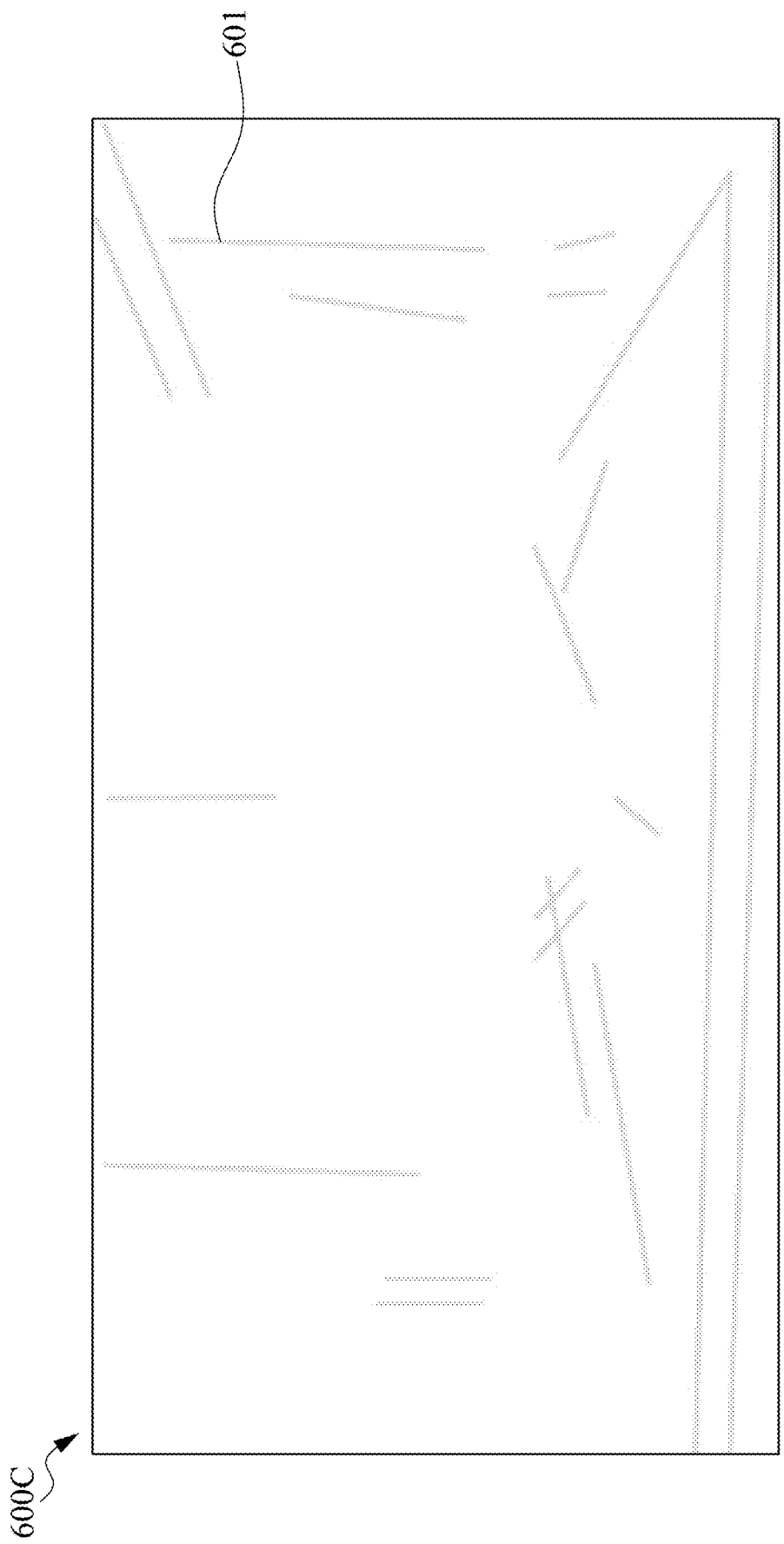
FIG. 6C is a schematic diagram of geometric features, in accordance with some embodiments of the present disclosure.

FIG. 6C is a schematic diagram 600C illustrating geometric features, in accordance with some embodiments of the present disclosure. Referring to FIG. 6C, the schematic diagram 600C merely shows geometric features 601 without the event frame 600 for clarity.

Figure 7A:
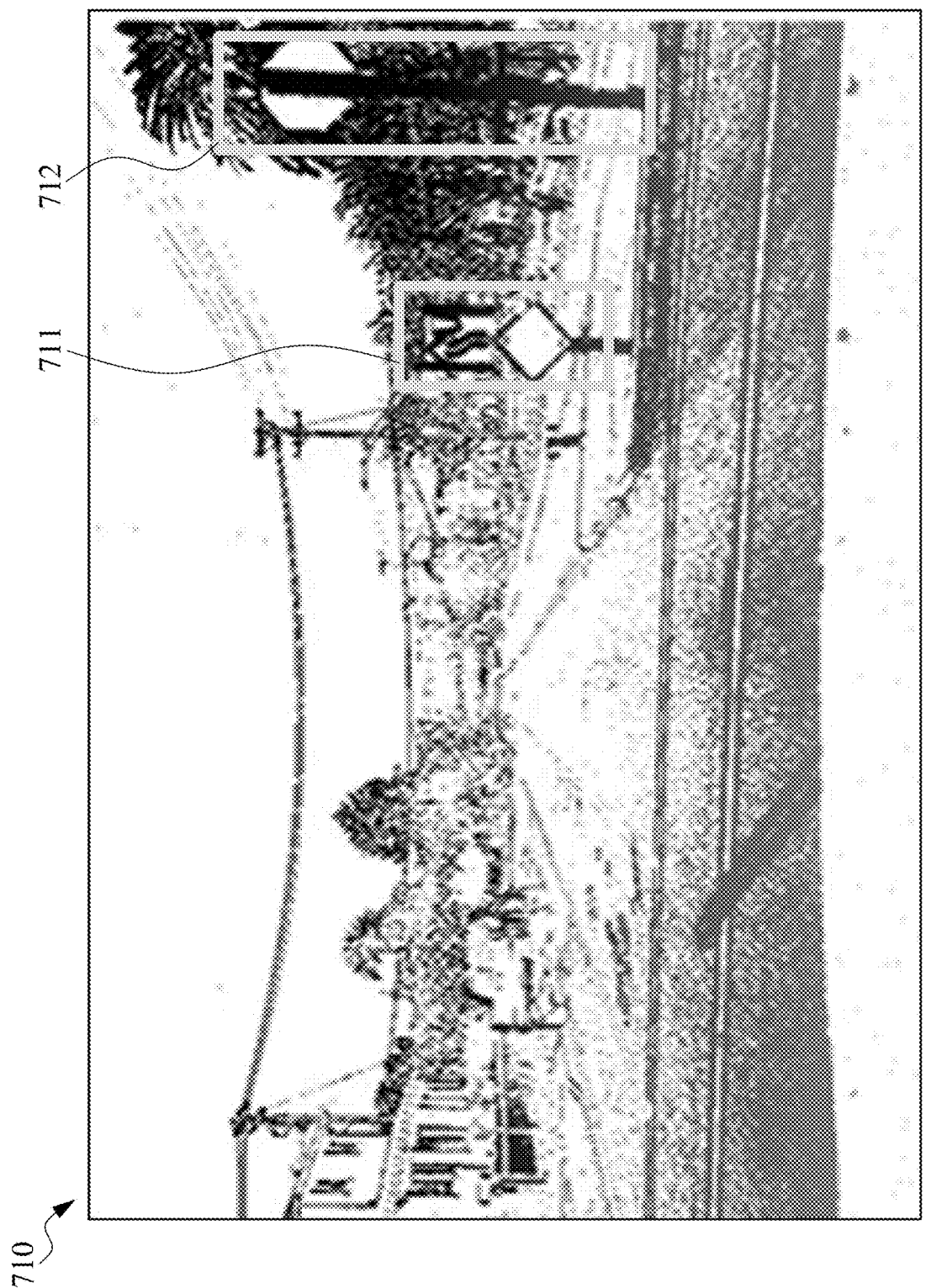
FIG. 7A is a schematic diagram of an event frame including determined geometric features, in accordance with some embodiments of the present disclosure.

FIG. 7A is a schematic diagram of an event frame 710 including determined geometric features, in accordance with some embodiments of the present disclosure. Referring to FIG. 7A, the event frame 710 includes interested objects 711 and 712, which may be recognized based on geometric features. The event frame 710 may show road conditions, including roads, houses beside the road, traffic signs, etc. In some embodiments, the interested objects 711 and 712 can be a block shape indicating the target feature. For example, the interested objects 711 and 712 can be traffic signs. In some embodiments, the interested objects 711 and 712 may be recognized based on one or more geometric features. For example, the boundary of the traffic signs may be determined by geometric features, and then the interested object 711/712 can be detected based on the downstream algorithms. Referring back to FIG. 2, the geometric features 243 in the event frame 710 can be extracted and be input to the downstream algorithms 250 for object detection, and then the interested objects 711 and 712 can be obtained.

Figure 7B:
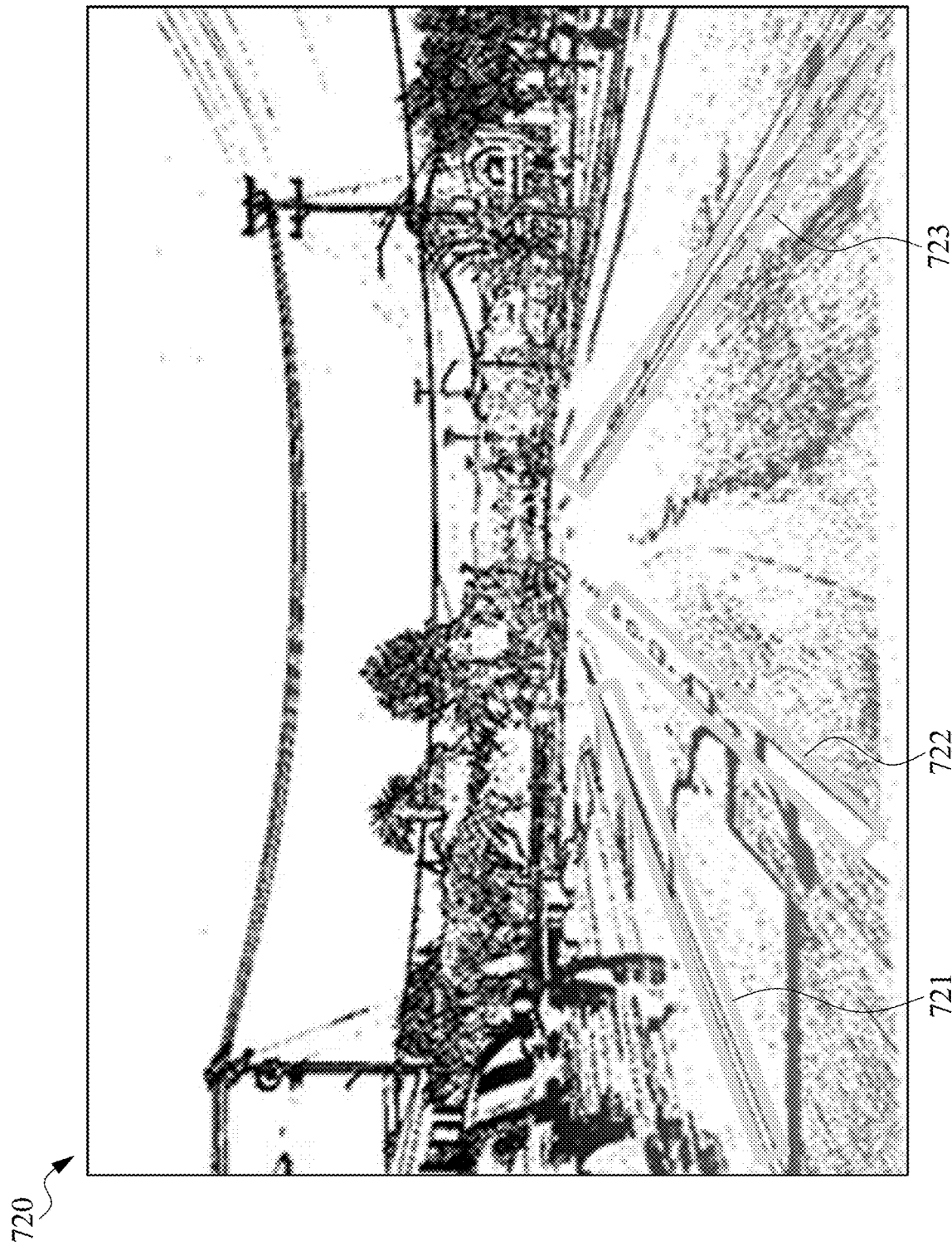
FIG. 7B is a schematic diagram of an event frame including determined geometric features, in accordance with some embodiments of the present disclosure.

FIG. 7B is a schematic diagram of an event frame 720 including determined geometric features, in accordance with some embodiments of the present disclosure. Referring to FIG. 7B, the event frame 720 includes interested objects 721, 722, and 723, which may be recognized based on geometric features. The event frame 720 can show road conditions, including the road, trees, other vehicles, lane markings, etc. In some embodiments, the interested objects 721, 722, and 723 can be a block shape indicating the target feature. For example, the interested objects 721, 722, and 723 can be lane markings. In some embodiments, the interested objects 721, 722, and 723 may be recognized based on one or more geometric features. For example, the boundary of the lane markings may be determined by geometric features, and then the interested objects 721, 722, and 723 can be detected based on the downstream algorithms. Referring back to FIG. 2, the geometric features 243 in the event frame 720 can be extracted and be input to the downstream algorithms 250 for object detection, and then the interested objects 721, 722, and 723 can be obtained.

Figure 7C:
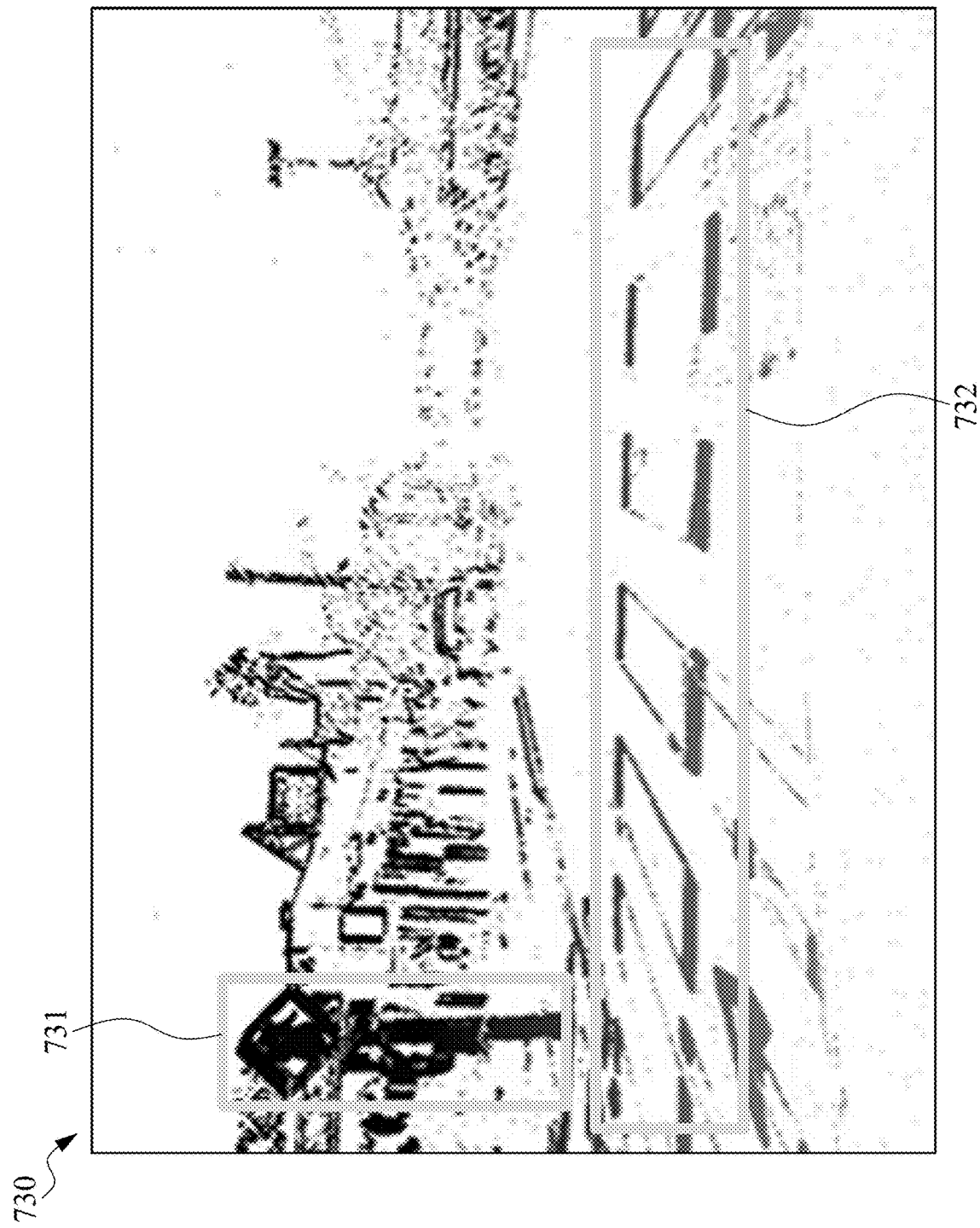
FIG. 7C is a schematic diagram of an event frame including determined geometric features, in accordance with some embodiments of the present disclosure.

FIG. 7C is a schematic diagram of an event frame 730 including determined geometric features, in accordance with some embodiments of the present disclosure. Referring to FIG. 7C, the event frame 730 includes interested objects 731 and 732. The event frame 730 can show road conditions, including the road, traffic signs, other vehicles, lane markings, etc. In some embodiments, the interested objects 731 and 732 can be a block shape indicating the target feature. For example, the interested object 731 can be a traffic sign. The interested object 732 can be lane markings. For instance, the object 732 can be a crosswalk. In some embodiments, the interested objects 731 and 732 may be recognized based on one or more geometric features. For example, the boundary of the traffic signs may be determined by geometric features, and then the interested object 731 can be detected based on the downstream algorithms. Similarly, the boundary of the crosswalk may be determined by geometric features, and then the interested object 732 can be detected based on the downstream algorithms. Referring back to FIG. 2, the geometric features 243 in the event frame 730 can be extracted and be input to the downstream algorithms 250 for object detection, and then the interested objects 731 and 732 can be obtained.

Figure 8:
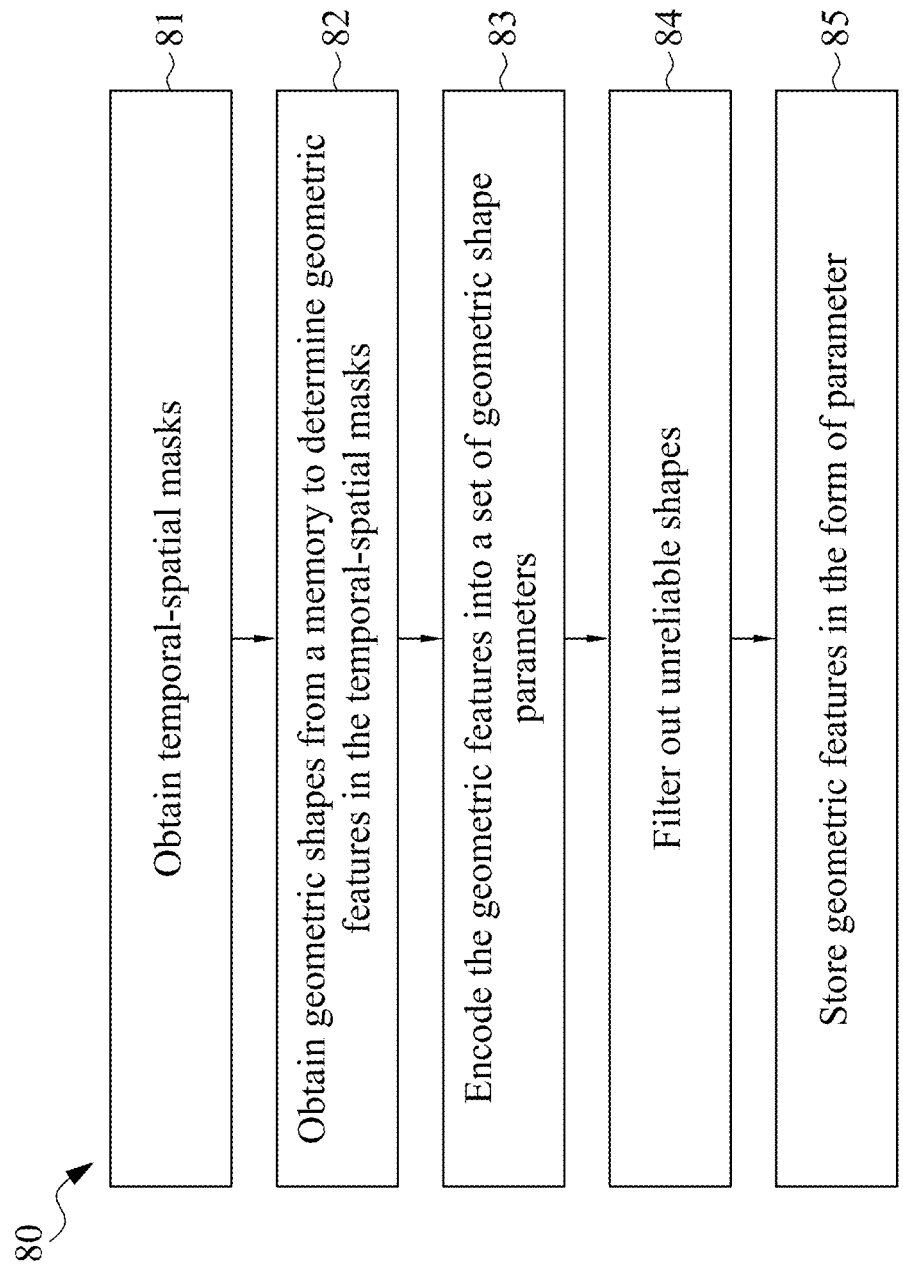
FIG. 8 is a flowchart of a method for detecting geometric features, in accordance with some embodiments of the present disclosure.

FIG. 8 is a flowchart of a method 80 for detecting geometric features, in accordance with some embodiments of the present disclosure. The operations of the method 80 can be executed by the processing unit 202.

In operation 81, temporal-spatial masks 241 can be obtained. In some embodiments, the geometric features can be obtained from the event frames 221 or temporal-spatial masks 241. In some embodiments, using the temporal-spatial masks 241 may be more efficient since the interested regions are already identified by the temporal-spatial masks 241.

In operation 82, geometric shapes can be obtained from a memory to determine geometric features 243 in the temporal-spatial masks 241. In some embodiments, the processing unit 202 can obtain the geometric shapes 244 from the memory to determine geometric features 243 in the event frame 221. In one embodiment, the memory can be a one-time programmable (OTP) memory. In some embodiments, geometric shapes for the temporal-spatial masks can be determined based on a shape-matching algorithm. For example, the shape-matching algorithm can detect the geometric features 243 in the temporal-spatial masks 241 by comparing the temporal-spatial masks 241 with the geometric shapes 244 from the memory. In some embodiments, the shape-matching algorithm may be based on Generalized Hough Transform or other shape-matching algorithms.

In operation 83, the geometric features 243 can be encoded into a set of geometric shape parameters. The processing unit 202 can be configured to encode the geometric features 243 into a set of geometric shape parameters. In some embodiments, the set of geometric shape parameters can be encoded according to a shape formula corresponding to the geometric shapes.

In operation 84, unreliable shapes can be filtered out. In some embodiments, the processing unit 202 can compare the detected geometric features and criteria, and then determine whether the detected geometric features are reliable. When geometric features are determined to be unreliable, the corresponding geometric shape parameters may be removed.

In operation 85, the geometric features 243 can be stored in the form of parameters. The geometric features 243 can be encoded into a set of geometric shape parameters and then stored into the memory in the parameter form. In other words, the image data can be converted to parameter data (text data). Accordingly, memory usage can be decreased.

Figure 9:
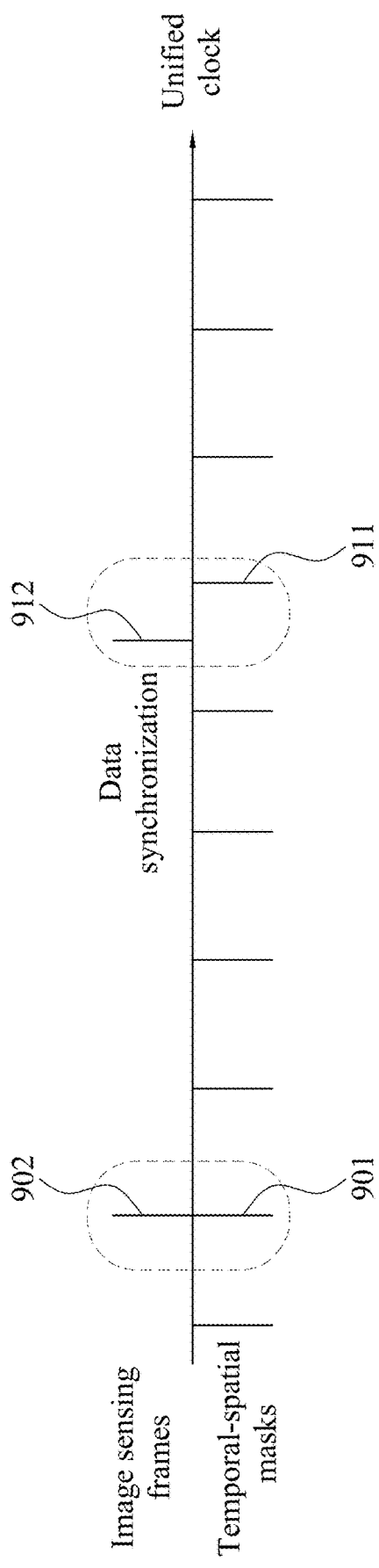
FIG. 9 is a schematic diagram of a method for synchronizing timestamps of image sensing frames and event frames, in accordance with some embodiments of the present disclosure.

FIG. 9 is a schematic diagram of a method for synchronizing timestamps of image sensing frames and event frames, in accordance with some embodiments of the present disclosure. Referring to FIG. 9, the image sensing frames can have timestamps along a unified clock, and the event frames (or the temporal-spatial masks) can have timestamps along the unified clock. In some embodiments, the image sensing frames can have a first frequency, and the event frames can have a second frequency different from the first frequency. For example, the second frequency can be higher than the first frequency. In some embodiments, an equivalent framerate of the image sensing frames can be 10, 30, or 60 fps. An equivalent framerate of the event frames can exceed 300, 500, or 1000 fps. Therefore, referring to FIG. 9, during the same time period, the image sensing frames can have a first number of timestamps, and the event frames can have a second number of timestamps, where the first number is less than the first number. In some embodiments, the image sensing frames can have two timestamps 902 and 912, and the event frames can have ten timestamps (for example, the timestamps 901 and 911).

The processing unit can determine the timestamp of the event frame closest to the timestamp of the image sensing frame. The timestamp 901 can be the one among the event frames closest to the timestamp 902 of the image sensing frame. For example, the timestamp 901 of the event frame can be substantially aligned with the timestamp 902 of the image sensing frame. In some embodiments, when performing the synchronization (or time alignment) of timestamps, the event frame and the image sensing frame can be synchronized by regarding the timestamp 901 and the timestamp 902 as aligned.

The processing unit can determine the timestamp of the event frame closest to the timestamp of the image sensing frame. For example, the timestamp 911 can be the one among the event frames closest to the timestamp 912 of the image sensing frame. In some embodiments, when performing the synchronization (or time alignment) of timestamps, the event frame and the image sensing frame can be synchronized by regarding the timestamp 911 and the timestamp 912 as aligned.

After the synchronization (or time alignment) of the image sensing frames and the event frames, the temporal-spatial mask generated from the event frame can correspond to a particular image sensing frame. For example, the event frame at the timestamp 901 can correspond to the image sensing frame at the timestamp 902. The event frame at the timestamp 902 can correspond to the image sensing frame at the timestamp 912. The timestamps of the event frames (the temporal-spatial mask) and image sensing frames are synchronized, such that the temporal-spatial mask can be fused with the image sensing frames accurately to obtain a masked visual image.

Figure 10:
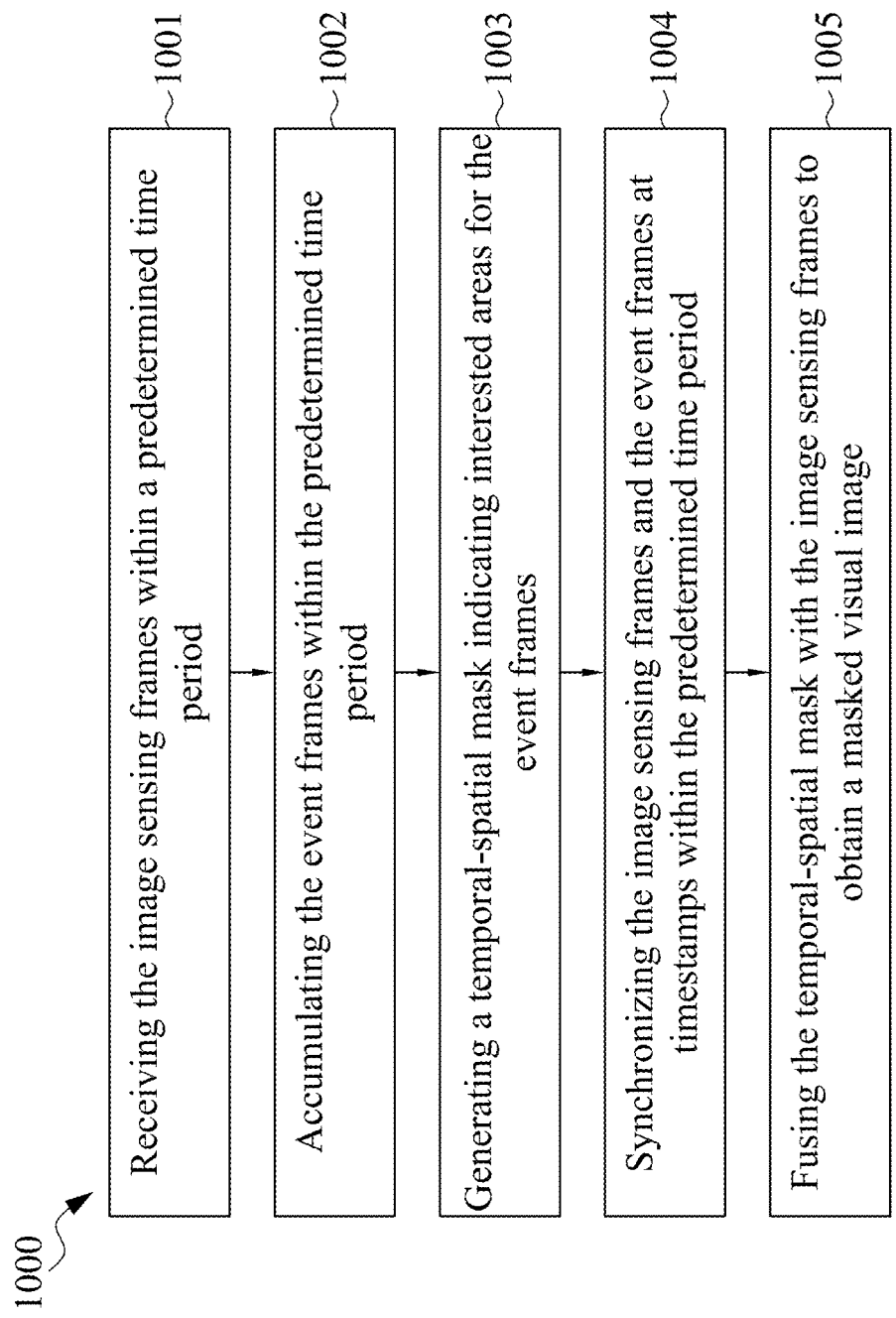
FIG. 10 is a flowchart of a method for fusing image sensing frames and event frames, in accordance with some embodiments of the present disclosure.

FIG. 10 is a flowchart of a method 1000 for fusing image sensing frames and event frames, in accordance with some embodiments of the present disclosure. The operations of the method 1000 can be executed by the processing unit 202. In some embodiments, the masked visual images 242 can be obtained according to method 1000.

In operation 1001, image sensing frames 231 within a predetermined time period can be received. In some embodiments, the image sensing frames 231 of a targeted scene can be obtained by the image sensor 230. The image sensing frames 231 may have a first frequency.

In operation 1002, event frames 221 within the predetermined time period can be accumulated. In some embodiments, the event frames 221 of the targeted scene can be obtained by the event-based sensor 220. The event frames 221 may have a second frequency higher than the first frequency.

In operation 1003, a temporal-spatial mask 241 indicating interested areas for the event frames can be generated. In some embodiments, the temporal-spatial mask 241 can be generated according to the method 50 shown in FIG. 5.

In operation 1004, the image sensing frames 231 and the event frames 221 at timestamps within the predetermined time period can be synchronized. In some embodiments, after the synchronization (or time alignment) of the image sensing frames 231 and the event frames 221, the temporal-spatial mask 241 generated from the event frame 221 can correspond to a particular image sensing frame 231.

In operation 1005, the temporal-spatial mask 241 can be fused with the image sensing frames 231 to obtain a masked visual image 242. In some embodiments, after aligning the timestamps of the image sensing frames 231 and the event frames 221 (i.e., the temporal-spatial masks 241), the temporal-spatial masks 241 can be fused with the particular image sensing frame 231 to obtain a masked visual image 242. The processing unit 202 can be configured to replace some portions of the image sensing frame 231 with one or more temporal-spatial masks 241 to generate the masked visual image 242. Since some portions of the masked visual image 242 are replaced by the temporal-spatial masks 241, which do not include the detailed image of the targeted scene, the masked visual image 242 may require lower resolution than the regular visual image. Thus, the masked visual image 242 can have lower memory usage and power consumption.

Figure 11C:
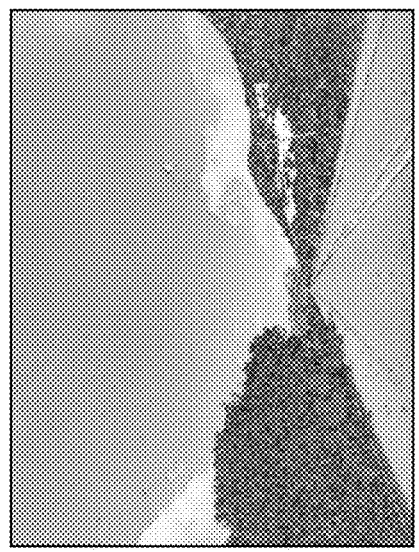
FIG. 11C is a masked visual frame of a targeted scene, in accordance with some embodiments of the present disclosure.
Figure 11B:
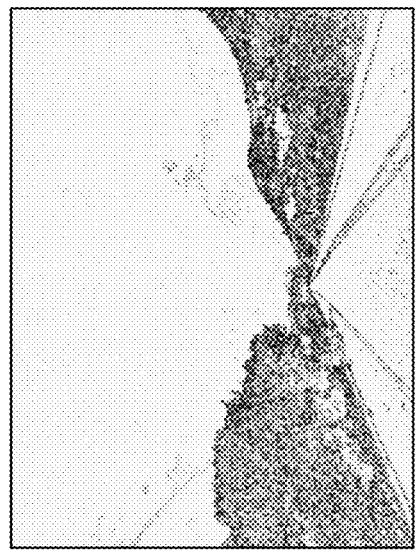
FIG. 11B is an event frame of a targeted scene, in accordance with some embodiments of the present disclosure.
Figure 11A:
FIG. 11A is a visual frame of a targeted scene, in accordance with some embodiments of the present disclosure.

FIG. 11A is a visual frame 1110A of a targeted scene, in accordance with some embodiments of the present disclosure. In some embodiments, the visual frame 1110A can be an example of the image sensing frame 231. The visual frame 1110A can be a color image. For example, the visual frame 1110A can include the road and the surrounding environment (such as mountains, trees, traffic signs, and lane markings).

FIG. 11B is an event frame 1110B of a targeted scene, in accordance with some embodiments of the present disclosure. In some embodiments, the event frame 1110B can be an example of the event frame 221. In some embodiments, the event frame 1110B can include the scene changes without color. For example, the event frame 1110B can show the scene changes in light intensity. In some embodiments, the event frame 1110B and the visual frame 1110A can capture the same targeted scene at a similar time.

FIG. 11C is a masked visual frame 1110C of a targeted scene, in accordance with some embodiments of the present disclosure. In some embodiments, the masked visual frame 1110C can be an example of the masked visual image 242. One or more temporal-spatial masks can be obtained from the event frame 1110B, and then be used to replace the corresponding portions of the visual frame 1110A to generate the masked visual frame 1110C.

Compared to conventional devices and methods using merely visual images, the present disclosure proposes a camera system and method employing information from the event sensor and the image sensor, thus providing faster response, higher dynamic range, less memory buffer and computation, and reduced power consumption. In addition, the scene-change detection and the selection among interest regions are more accurate and robust by use of the event sensor. The temporal-spatial mask can indicate the area that requires attention, and thus the camera system operates more efficiently by processing/analyzing the temporal-spatial mask. The masked visual image fuses the image sensing frame and the temporal-spatial mask, such that the amount of data can be decreased. The geometric features detected from the EVS frames can be used to assist lane markings and crosswalk detection. In some embodiments, the geometric features can be used in the navigation system.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, and steps.

What is claimed is:

1. A camera system, comprising:
an image sensor, configured to capture visual images of a targeted scene to obtain image sensing frames with a first frequency;
an event-based sensor, configured to capture event data of the targeted scene to obtain event frames with a second frequency higher than the first frequency;
a processing unit configured to:
receiving the image sensing frames within a predetermined time period;
accumulating the event frames within the predetermined time period;
generating a temporal-spatial mask indicating interested areas for the event frames;
determining geometric features in the temporal-spatial masks;

synchronizing the image sensing frames and the event frames at timestamps within the predetermined time period; and fusing the temporal-spatial mask with the image sensing frames to obtain a masked visual image.

2. The camera system of claim 1, wherein generating the temporal-spatial mask comprises:

determining whether a scene change occurs in the targeted scene according to the event frames.

3. The camera system of claim 1, wherein the event frames indicate light intensity changes occurring in the targeted scene.

4. The camera system of claim 1, wherein the temporal-spatial mask is generated under at least one predetermined granularity.

5. The camera system of claim 1, further comprising a memory storing geometric shapes of specified objects, wherein the processing unit is further configured to obtain the geometric shapes from the memory to determine the geometric features in the temporal-spatial masks.

6. The camera system of claim 5, wherein the predetermined shapes comprise at least one of points, straight lines, curves, circles, rectangles, triangles, ellipse, and trapezoid.

7. The camera system of claim 5, wherein the processing unit is further configured to encode the geometric features into a set of geometric shape parameters.

8. The camera system of claim 7, wherein the set of geometric shape parameters is encoded according to a shape formula corresponding to the predetermined shapes.

9. The camera system of claim 7, wherein the processing unit is further configured to filter out unreliable shapes.

10. The camera system of claim 1, wherein the image sensor is a CMOS image sensor (CIS).

11. The camera system of claim 1, wherein a frequency of the timestamps is substantially related to the first frequency.

12. The camera system of claim 1, wherein the processing unit is further configured to denoise the event frames.

13. The camera system of claim 1, the processing unit is further configured to analyze connected-component for the event frames.

14. The camera system of claim 13, wherein the processing unit is further configured to segment the event frames to into granularities.

15. The camera system of claim 1, the processing unit is further configured to track movements of specified objects.

16. An event-assisted image processing method, comprising:

obtaining image sensing frames of a targeted scene with a first frequency within a predetermined time period;

obtaining event frames of the targeted scene with a second frequency higher than the first frequency within the predetermined time period;

generating a temporal-spatial mask indicating interested areas for the event frames;

determining geometric features in the temporal-spatial masks;

synchronizing the image sensing frames and the event frames at timestamps within the predetermined time period; and fusing the temporal-spatial mask with the image sensing frames to obtain a masked visual image.

17. The method of claim 16, further comprising determining whether a scene change occurs in the targeted scene according to the event frames.

18. The method of claim 16, wherein the event frames indicate light intensity changes occurring in the targeted scene.

19. The method of claim 16, wherein the determining the geometric features in the temporal-spatial masks is based on stored geometric shapes of specified objects.

20. The method of claim 19, further comprising:

determining geometric shapes for the temporal-spatial masks based on a shape-matching algorithm; and encoding the geometric features into a set of geometric shape parameters.

* * * * *